J. F. METTEN.
TORSION METER.
APPLICATION FILED JUNE 3, 1909.
1,164,839.
Patented Dec. 21, 1915.
3 SHEETS—SHEET 2.
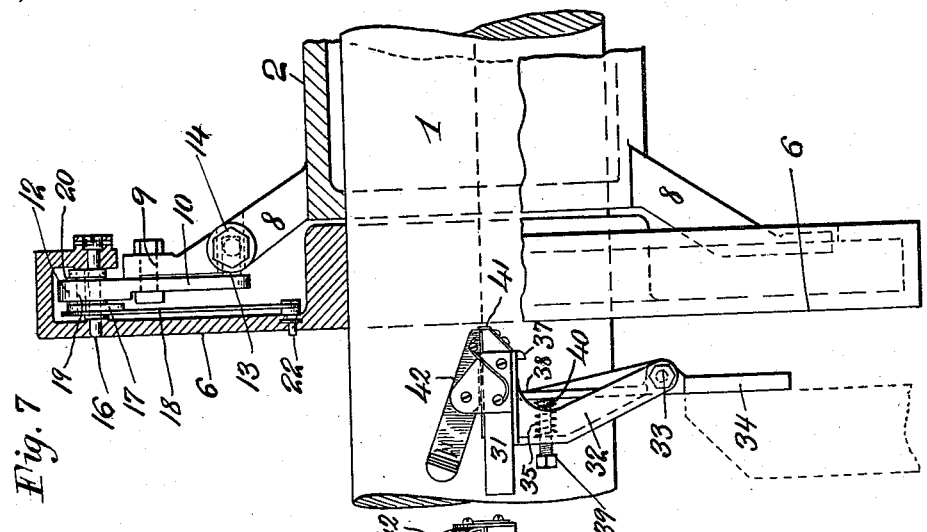
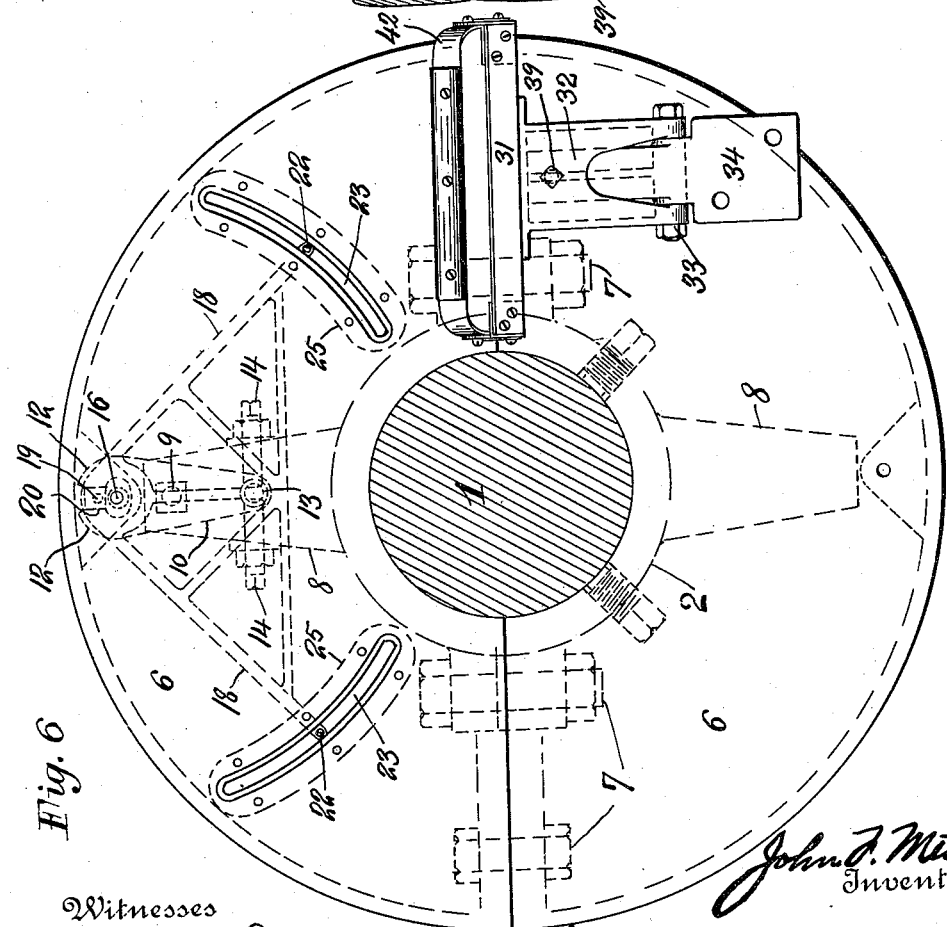
Witnesses
Edmund O. Duboeq.
Peter A. Roe
John F. Metten
Inventor
By his Attorneys
Edwards, Sager & Wooster J. F. METTEN.
TORSION METER.
APPLICATION FILED JUNE 3, 1909.
1,164,839.
Patented Dec. 21, 1915.
3 SHEETS—SHEET 3.
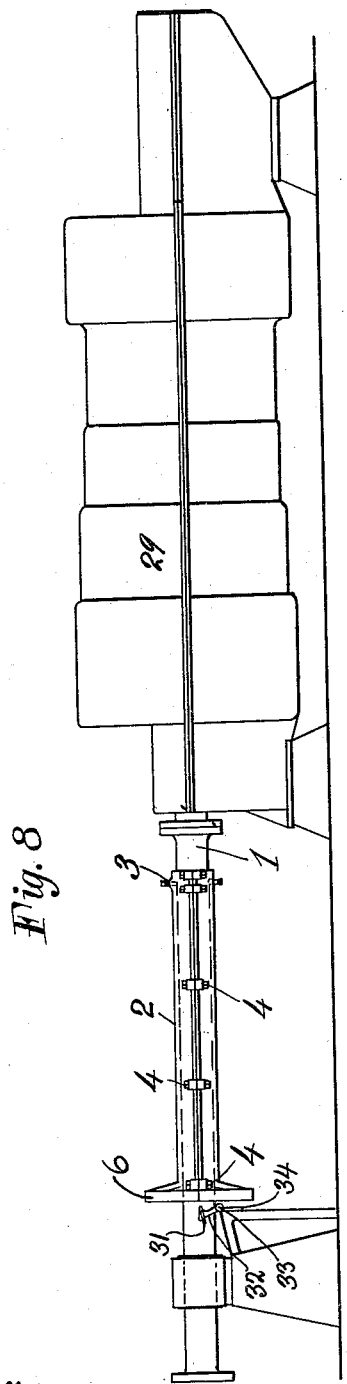
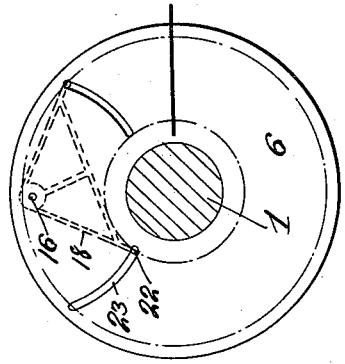
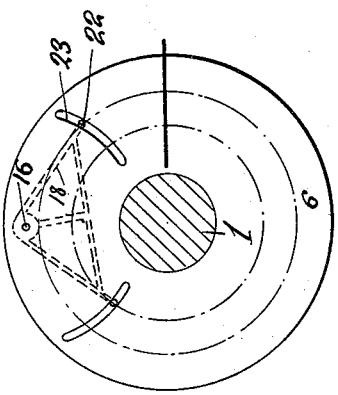
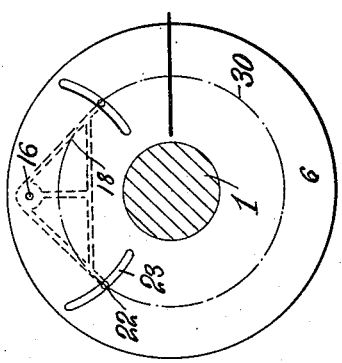

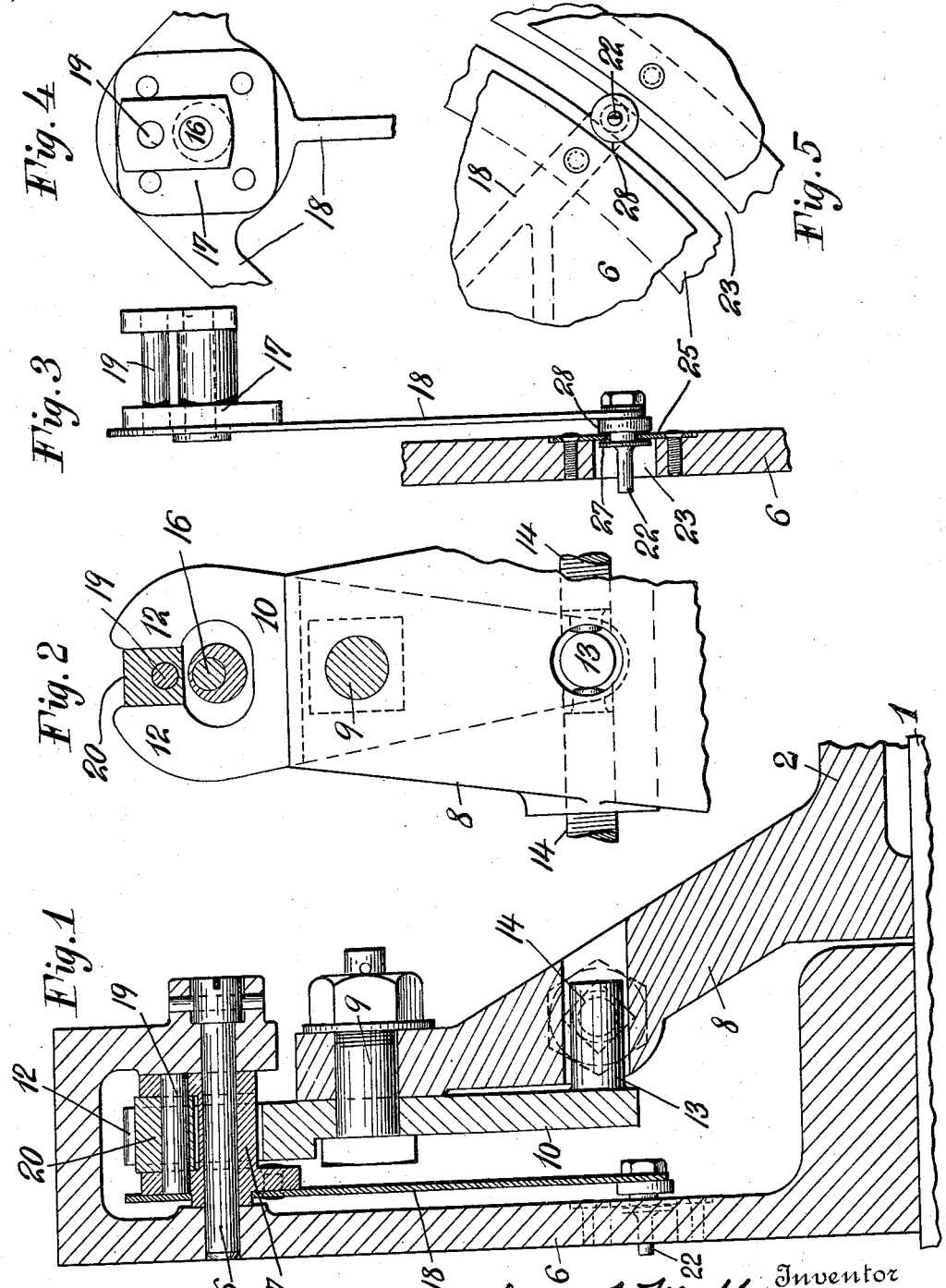

UNITED STATES PATENT OFFICE.

JOHN F. METTEN, OF PHILADELPHIA, PENNSYLVANIA.

TORSION-METER.

1,164,839.  Specification of Letters Patent.  Patented Dec. 21, 1915.

Application filed June 3, 1909. Serial No. 500,032.

*To all whom it may concern:*

Be it known that I, JOHN F. METTEN, a citizen of the United States, residing at Philadelphia, in the county of Philadelphia and State of Pennsylvania, have invented certain new and useful Improvements in Torsion-Meters, of which the following is a full, clear, and exact specification.

This invention relates to torsion meters, and more particularly to measuring apparatus for determining the power being transmitted by a driven shaft, as for instance, the propeller shaft of a ship. It is known that when a shaft is transmitting power it is under a certain degree of torsion or deflection, and the object of this invention is to utilize this torsion of the shaft to actuate indicating devices which will vary from a normal position according to the torsion, which is a function of power being transmitted, and capable of being empirically determined for each individual shaft.

The objects of this invention are to provide a torsion meter which will produce permanent and extremely accurate records which will be entirely independent of the quickness or skill of the operator taking the record, and to provide an apparatus wherein the possibility of errors of observation will be eliminated.

In carrying out the invention, I have provided an apparatus comprising two parts adapted to be secured at separated points to the shaft whose horse power is to be measured, one part consequently being angularly displaced relatively to the other when the shaft is transmitting power, together with multiplying devices controlled by the torsional or angular deflection of one part relatively to the other, and actuated marking devices so disposed as to mark a record sheet when an observation is to be taken. In combination therewith is provided a record sheet supporting table normally held out of operative position, but capable of being moved to bring the record sheet into position to be marked when a record is to be taken.

The invention will be more fully understood in connection with the description of the accompanying drawings, wherein—

Figure 1 shows a section of an apparatus embodying the invention taken longitudinally of the shaft, Fig. 2 is a detail view of the indicator actuating element, Fig. 3 is a side view of the indicator and recording element, Fig. 4 is a front view of a portion of the indicating element, Fig. 5 is a detail of another portion of the indicating element, Fig. 6 is a face view of an apparatus embodying the invention seen from the rear, Fig. 7 is a view similar to Fig. 1 showing, in addition, the position of the record card table, Fig. 8 is a longitudinal view of a turbine driven shaft having the invention applied thereto, and Figs. 9, 10 and 11 show respectively the neutral position of the indicator when no load is being transmitted by the shaft, and two positions when the shaft is transmitting different amounts of power.

1 represents a shaft having a sleeve 2 rigidly secured thereto at the point 3. The sleeve 2 is preferably made in two halves, which will be secured together by clamping bolts 4, but it will be understood that the bolts 4 simply hold the two halves of the sleeve together without engaging it with the shaft. From this it will appear that when the shaft is transmitting power it will be subject to angular deflection or torsion, while the sleeve, being simply secured to the shaft at one point 3, will not be subjected to torsion or angular deflection. The sleeve will be made sufficiently long in practice so that there will be an appreciable deflection of the shaft when under load relatively to the sleeve, and from records of this deflection the calculations of the horse power being transmitted will be made.

6 represents a divided disk which will be rigidly clamped to the shaft adjacent the end of the sleeve 2 by bolts 7, so that the end of the sleeve 2 nearest the disk will always be angularly deflected in the direction of rotation of the shaft relatively to the disk 6.

Mounted on the end sleeve 2 are opposite arms 8, only one of which will be used to support the indicating devices, the other being provided to dynamically balance the device when the shaft is rotating. Pivoted on one arm 8 by a bolt 9 is a lever 10 having the separated ends 12 and a stud 13 carried at its lower end adapted to be angularly adjusted by set screws 14 carried in the arms 8. Pivoted on a stud 16 carried in disk 6 is a block 17, to which is riveted a pair of rigidly connected indicator arms 18. Also carried by the block 17 is a stud 19 passing through a squared block 20 closely fitted between the forked ends 12 of lever 10, and engaged by the latter.

Fig. 6 shows a general design of the indicator 18, from which it will be seen that it consists of a light framework connecting two arms, and that the free ends of the two arms of the indicator are provided with knives or other marking devices 22, which project through slots 23 in the disk 6.

In Fig. 3 is shown a detail of this construction, wherein it will be seen that the slot 23 contains a bushing plate 25 countersunk therein, and the indicating knife or point 22 has shoulders 27, 28 on opposite sides of bushing plate 25, these shoulders preventing vibration of the knife except in a plane parallel to the face of the disk 6.

If the shaft 1 be clamped against rotation at the disk 6 and a torque be applied to the shaft at the point 3, a vibration of the indicating points 22 in the slots 23 would be produced, depending upon the amount of torque applied to the shaft at the point 3. This will result by reason of whatever deflection there is on the shaft at the point 3 being communicated in equal degree to the end of the sleeve 2, and through the arm 8, pivot 9, lever 10 and block 20, will oscillate the indicator 18 on its pivot 16 from the neutral position shown in Fig. 9 to position shown in Figs. 10 or 11, Fig. 11 showing a greater deflection of the indicator 18 and consequently having a greater torque applied to the shaft 1 at 3. If the torque be applied in the other direction, of course the indicator 18 would be oscillated in a reverse direction. The same conditions exist when the shaft is being rotated as by the turbine 29 in Fig. 8, the rear end of the shaft having the load always being, on account of the elasticity of the shaft, a certain angular amount behind the driving end of the shaft, and consequently producing a deflection of the indicator 18. The function of the set screws 14 is to adjust the lever 10 and consequently the indicator 18, so that the knives 22 when the shaft is rotating without load will travel in the same circle, as 30 (Fig. 9).

In order to make an indication, it will simply be necessary to hold a card against the face of the disk 6 so that the knives will cut slots in the edge of the card, and the distance between these slots will be a function of the horse power being transmitted by the shaft. It will thus be seen that the actual difference between the two cuts will be twice the movement of the knives, since one moves toward the center of the disk and one away from the center. These cuts will thus be a permanent record of the twisting force on the shaft at the time the cuts were made. In order to compute the power transmitted, it is only necessary to know the speed of revolution at which the record is taken and the twisting moment represented by the distance the cuts are separated. The latter is effected as follows: The shaft upon which the instrument is to be fixed is mounted upon a bearing, preferably of the roller type in order to eliminate friction, and between the bearings the torsion meter is installed and mounted on the shaft, as above described, with the two pointers or knives adjusted so as to both come exactly on the neutral circle 30. One end of the shaft is then firmly clamped to prevent turning, while at the other end is attached a lever of known length and a known power or torque applied to the lever, varying from small amounts up to the extreme load the shaft is intended to transmit in service. During the application of each load to the shaft, the deflection of the pointers from the neutral circle is accurately measured and a scale prepared therefrom showing the torques in inch or foot pounds represented by such deflection. After this table is made up, the shaft is then installed where it is to be used, and the table as made up from the tests is observed so as to enable the horse power to be calculated from the known number of revolutions and the known torques required to produce certain deflections of the points.

In order to enable these records to be conveniently taken when the shaft is installed, a small wooden table 31 having its edge parallel with the face of disk 6 is mounted on a fixed part of the ship in such manner as to be swung away from the disk when not in use so as to be out of the way of the revolving disk and point. The table 31 is mounted on an arm 32 pivoted at 33 to a bracket 34, and between the arm 32 and the bracket 34 is interposed a spring 35, which normally holds the table tilted backwardly away from the face of the disk, the lug 37 engaging the upper end 38 of the bracket 34, thereby limiting the backward movement. The forward movement of the table toward the disk is limited by a set screw 39 engaging a stop lug 40 on the bracket 34, which can of course be adjusted to bring the table the correct distance from the face of the disk. On the surface of the table at the edge adjacent the disk are mounted stop plates 41 to engage the edges of a card and a pivoted spring clamp 42. When a record is to be taken, the clamp is lifted and a card inserted against the stops 41 and then held by the clamp. Then the table is pushed toward the disk as far as it will go, and the revolutions of the knives cut slots in the card. When the shaft is not transmitting any load, it will be seen that both of the knives will revolve in the same circle, cutting only a single slot, but when the shaft is loaded two slots will be cut at a distance apart equal to the total movement of the two knives or points, this distance being a function of the load. From these measurements and charts made up from the tests of each shaft the horse power being transmitted can be determined at a known number of revolutions.

From the above description, it will be seen that the arrangement of two knives or measuring points on opposite sides of the fulcrum give double length of scale that could be obtained by ordinary means with the same centers. This allows the actuating points to be given sufficient throw and distance from the fulcrum as to avoid the difficulties which would be experienced by devices which multiply the effects of the deflection on the scales. The records are permanent and do not depend upon the accuracy of the operator, while extreme accuracy of results is produced, as there are few joints involving lost motion, and the wearing surfaces can be made ample to avoid inaccuracy due to wear. The instrument being calibrated directly with its shaft, errors of observation &c. are eliminated, and furthermore, the moving parts of the recording mechanism are so arranged as to permit of being dynamically balanced, which is important at high speeds in order to insure accuracy.

Modifications and changes in the specific construction herein described may be made without departing from the scope of the invention.

Having thus described my invention, I declare that what I claim as new and desire to secure by Letters Patent, is:—

1. The combination in a torsion measuring device, of a continuous shaft rigidly carrying two parts at axially displaced points subject to relative angular displacement by the torsion of the shaft, a movable projecting marker mounted on one of said parts to rotate with the shaft in paths varying with the torsion between said parts, actuating means connecting said marker and the other part, and a record device independent of the shaft adapted to be engaged by the rotating marker to obtain an instantaneous record of the path of rotation of said marker without stopping the shaft.

2. The combination in a torsion indicating mechanism, of a shaft carrying two parts at longitudinally displaced points subject to relative angular displacement by the torsion of the shaft, a projecting marker pivoted on one of said parts and rotating with the shaft in paths varying with the torsion between said parts, an adjustable actuating device mounted on the other part and moving said marker at a multiplied rate to an abnormal path of rotation varying with the torsion between the points carrying said parts, and a record device independent of the shaft adapted to be engaged by the rotating marker to obtain an instantaneous record of the path of rotation of said marker without stopping the shaft.

3. The combination in a torsion indicating mechanism, with a shaft carrying two parts subject to relative angular displacement, of an indicator pivoted on one of said parts, said indicator having two separated markers normally disposed to rotate in the same circle, and being mounted to cause said markers to move away from said circle in response to torsion of said shaft, an actuating device for moving said indicator to displace said markers from normal position when said parts are angularly displaced, and means for obtaining a record of the instantaneous circles of rotation of said markers.

4. The combination in a torsion indicating mechanism with two connected and rotatable parts subject to relative angular deflection, of an indicator having a plurality of markers mounted on one of said parts to be responsive to relative angular displacement of said parts, lever actuating connections for said indicator carried by the other part, said indicator and markers being arranged to permit a record of the combined displacement of said markers.

5. The combination in a torsion indicating device comprising two connected and rotatable parts subject to relative angular displacement, of an indicating device having a plurality of markers adapted to make a common mark for no angular displacement, and a plurality of separated marks when said parts are angularly displaced, and means responsive to relative angular displacement of said parts for controlling the position of said indicating device.

6. The combination in a torsion indicating device comprising two connected and rotatable parts subject to relative angular displacement, of an indicating device having a plurality of markers adapted to make a common indication for no angular displacement, and a plurality of indications varying in distance apart proportionately to the angular displacement when said parts are angularly displaced, and connections between said parts for controlling said indicating device.

7. The combination in a torsion indicating device with two connected and rotatable parts subject to relative angular displacement, of a lever mounted on one of said parts, an indicator arm pivoted on the other part and connected to be actuated by said lever, and a marking member movable by said indicator arm in response to varying angular displacement of said parts.

8. The combination in a torsion indicating device with two connected and rotatable parts subject to relative angular displacement, of a lever mounted on one of said parts, a double indicator arm pivoted on the other part and connected to be actuated by said lever, and means whereby an indication of the movement of both arms may be made.

9. The combination with a shaft, of a sleeve secured thereon at one end to surround the shaft at its other end, a disk carried by the shaft adjacent the free end of the sleeve, an indicator pivoted on the disk and having a marking point extending longitudinally of the shaft, and means for obtaining records of the position of said marking point when the shaft is under varying degrees of torsion.

10. The combination in a torsion indicating device with two connected and rotatable parts subject to relative angular displacement, of an indicator mounted on one of said parts to rotate with the shaft in paths varying with the torsion between said parts and vibrated from one path to another when said parts are angularly displaced, an arm mounted on the other part and engaging said indicator and a record device independent of the shaft adapted to contact with said indicator during its rotation to record the instantaneous path of rotation of said indicator without stopping the shaft.

11. The combination in a torsion indicating device with a continuous shaft, of a collar secured thereto at one point, and a tubular sleeve at a distant point, an indicator mounted on one of said parts to rotate with the shaft in projecting paths varying with the torsion between said parts and mechanically connected to the other part to be vibrated by the torsion of said shaft between said supporting points, and a record device independent of the shaft adapted to contact with said indicator during its rotation to record the instantaneous path of rotation of said indicator without stopping the shaft.

12. The combination in a torsion indicating device with two parts mounted on a shaft and subject to relative angular displacement, of an indicator mounted on one of said parts to vibrate during rotation in a plane perpendicular to the axis of rotation, means on the other part for causing such vibration, a point carried by said indicator extending longitudinally of the axis of rotation, and a stationary record sheet to be intermittently marked by said point.

13. The combination in a torsion indicating mechanism with two connected and rotatable parts subject to relative angular deflection, of an indicator having a marker responsive to such deflection mounted on one part and rotating with the shaft in projecting paths varying with the torsion between said two parts, actuating connections for said marker carried by the other part, and a support movable into and out of position adjacent the path of rotation of said marker for taking record on a sheet carried thereby of the instantaneous path of rotation of said marker without stopping the shaft.

14. The combination in a torsion indicating mechanism with two connected and rotatable parts subject to relative angular deflection, of an indicator responsive to torsion mounted on one part and rotating with the shaft in projecting paths varying with the torsion between said parts, actuating connection for said marker carried by the other part and a sheet support held normally out of operation and movable to a position adjacent the projecting path of rotation of said marker for making a record on a sheet carried thereby of the instantaneous path of rotation of said marker without stopping the shaft.

15. The combination in a torsion indicating mechanism with two connected and rotatable parts subject to relative angular deflection, of an indicator responsive to torsion mounted on one part, actuating connections therefor carried by the other part, and a stationary sheet support adjacent the path of rotation of said indicator having sheet clamping means and movable into and out of position for taking a record of the path of rotation of said indicator.

16. The combination in a torsion indicating mechanism with two rotatable parts subject to relative angular displacement, of marking means responsive to torsion and rotating with the shaft in unobstructed projecting paths varying with the torsion between said parts, and a sheet independent of the shaft and movable to contact with the path of rotation of said marking means to receive marks varying according to the torsion between said parts, to take a record without stopping the shaft.

17. The combination in a torsion indicating apparatus comprising two parts carried by a shaft and subject to relative angular displacement of a plurality of movable indicating points carried by one of said parts, actuating connections between said indicating points and the other part, means for adjusting the normal position of said points relatively to said parts, said points in normal position rotating in the same path, and when displaced, in different paths.

18. The combination in a torsion indicating apparatus comprising two parts carried by a shaft and subject to relative angular displacement, of a plurality of movable indicating points carried by one of said parts, actuating connections between said indicating points and the other part, means for adjusting said points to determine a no-load position, said points in normal position rotating in the same path, and when displaced, in different paths.

19. The combination in a torsion indicating mechanism, with a continuous shaft carrying two parts at longitudinally-displaced points and subject to relative angular displacement by the torsion of the shaft, of a marker mounted on one part and rotating with the shaft in projecting paths varying with the torsion between said parts, an actuating device mounted on the other part and having connection with said marker, and means independent of the shaft for obtaining a permanent record of the instantaneous path of rotation of said marker without stopping the shaft.

20. The combination in a torsion indicating mechanism, of a continuous shaft rigidly carrying two parts at longitudinally displaced points and subject to relative angular displacement by the torsion of the shaft, a marker connected to and controlled by said parts so as to move to an abnormal position in proportion to the torsion of said shaft between the points carrying said parts, said marker projecting externally of its support so as to rotate with the shaft in projecting paths varying with the torsion between said parts, and means independent of the shaft for obtaining by contact with said rotating marker a record of the instantaneous path of rotation of said marker without stopping the shaft.

21. The combination in a torsion indicating mechanism of a shaft carrying a plurality of rotatable markers, said markers rotating with the shaft one in advance of the other, and means whereby said markers successively make marks on a record sheet spaced apart proportionately to the torsion in a predetermined section of said shaft.

22. The combination in a torsion indicating mechanism, of a shaft carrying two parts subject to relative angular displacement, a plurality of markers connected to said parts and rotating with said shaft one in advance of the other, and means adapting said markers to mark spaces on a record sheet varying with the angular displacement of said parts.

23. The combination in a torsion indicating mechanism, of a shaft carrying two parts subject to relative angular displacement, a plurality of cutting markers connected to said parts and rotating with said shaft, and means adapting said markers to make cuts in a record sheet varying in distance apart with the angular displacement of said parts.

24. The combination in a torsion indicating mechanism, of a shaft carrying two parts subject to relative angular displacement, a plurality of markers connected to said parts and rotating with said shaft, means for supporting a record sheet adjacent the paths of rotation of said markers so as to be marked thereby, and means whereby the torsion of the shaft between said parts varies the distance between marks made on the record sheet by said markers.

25. The combination in a torsion indicating apparatus comprising two connected and rotatable parts subject to relative angular displacement, of a pivoted indicator having a marker on each side of the pivot, and actuating connections for causing said markers to make a single indication for no load and a plurality of indications for a load.

26. The combination in a torsion indicating apparatus comprising two connected and rotatable parts, subject to relative angular displacement, of a marker carried on one part and having actuating connection with the other part, said marker rotating with the shaft in one path when the shaft is not loaded, and in another and different path varying with the load, when the shaft is loaded.

In testimony whereof I affix my signature. in presence of two witnesses.

J. F. METTEN.

Witnesses:
Isaac Arrott,
Louis B. McQuaide.

Copies of this patent may be obtained for five cents each, by addressing the "Commissioner of Patents, Washington, D. C."